Figure 1:
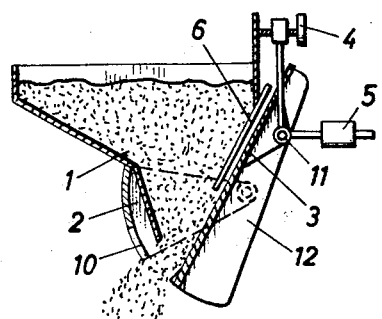

June 2, 1964  M. SIEGBURG  3,135,427
CHARGING HOPPER FOR BALANCES FOR LOOSE BULK MATERIAL
Filed Jan. 4, 1961  3 Sheets-Sheet 1

June 2, 1964 M. SIEGBURG 3,135,427
CHARGING HOPPER FOR BALANCES FOR LOOSE BULK MATERIAL
Filed Jan. 4, 1961 3 Sheets-Sheet 2

June 2, 1964   M. SIEGBURG   3,135,427
CHARGING HOPPER FOR BALANCES FOR LOOSE BULK MATERIAL
Filed Jan. 4, 1961   3 Sheets-Sheet 3
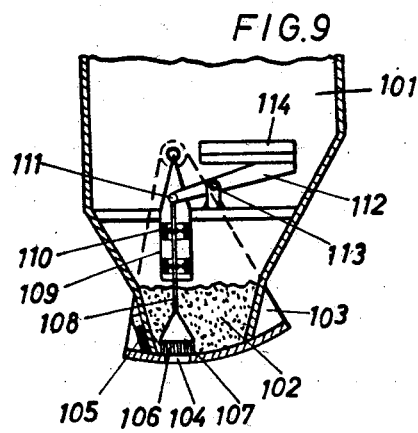
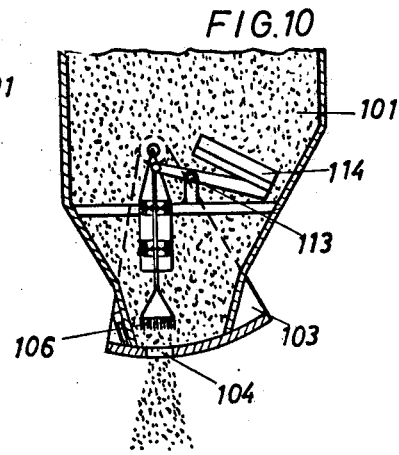
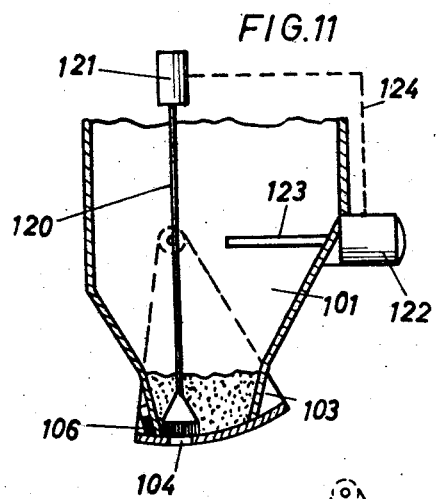
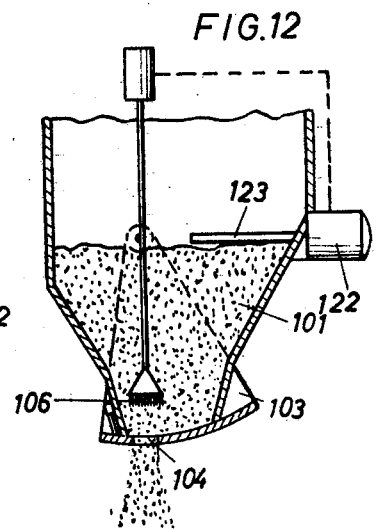
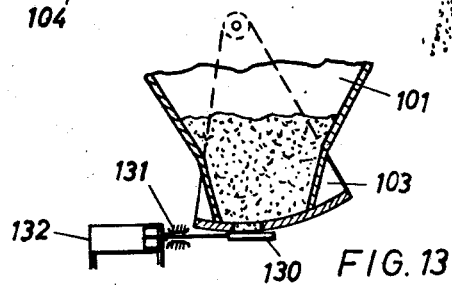

United States Patent Office 3,135,427
Patented June 2, 1964

3,135,427
CHARGING HOPPER FOR BALANCES FOR
LOOSE BULK MATERIAL
Michael Siegburg, Pretzfelderstrasse 13,
Munich-Aubing, Germany
Filed Jan. 4, 1961, Ser. No. 80,667
Claims priority, application Germany Jan. 5, 1960
9 Claims. (Cl. 222—58)

The present invention relates to a charging hopper for automatic balances for the weighing of fine-grained loose bulk material, especially for sacking and recording balances with coarse and fine weighing arrangement.

In order to obtain precise weighings in sacking and recording balances it is known to provide the charging hopper of the balance with a coarse and fine weighing opening. While the coarse weighing opening, which corresponds to the actual discharge of the loose bulk material, is formed by the hopper walls and for this purpose a closure flap is provided, as a rule the fine weighing opening is a piercing in this closure flap. Various means can be provided for the closure of this fine weighing opening. Since however even with such a fine weighing opening precise weighings are only possible when an adequate quantity of loose bulk material is always available in the hopper in order to terminate the weighing operation in each case during the fine weighing without interruption of the flow of the loose bulk material, hitherto one or more supply or storage spaces have been provided in the hopper. This division of a charging hopper into a plurality of chambers is however complicated and expensive. Especially in the case of the weighing out of uncleaned grain the supply spaces feeding the fine weighing arrangement are frequently blocked, so that inexact weighings and interruptions of operation ensue.

Therefore in accordance with the invention a charging hopper for automatic balances is proposed, which avoids constructions provided in the hopper.

In accordance with the invention for the closure of the fine weighing opening or openings means are provided which only release this fine weighing opening when a predetermined quantity of loose bulk material, which is at least sufficient for the termination of the weighing operation, is present in the hopper.

These means for the closing of the fine weighing opening preferably consist of one or more hinged walls pivoting into the discharge of the hopper. In order to bring these hinged walls or this wall into the position for the closing of the fine weighing opening under the stated conditions, various closure arrangements can be provided. A simple kind provides for example a counter-weight or a spring force. In order to keep the counter-weight small, especially in the case of relatively large weighed quantities, and in order to achieve a favourable tilting angle for the counter-weight, the latter can also be mounted on a lever arm.

If the hinged wall is controlled directly by the load of the quantity of loose bulk material resting thereabove, a cover plate can be provided which is movable for the regulation of the load pressure over the hinged wall. Especially in the case of a relatively steep arrangement of the hinged wall it can be advantageous to provide thereon load surfaces projecting into the hopper space for the loose bulk material.

Finally the means for the closing of the fine weighing opening can also be controlled electrically or by mechanical transmission arrangements dependent upon the quantity of loose bulk material. Such an indirect actuation of the closure means is advantageous when these fine weighing closure means are formed by reciprocally movable slides, pistons or the like.

Figure 4:
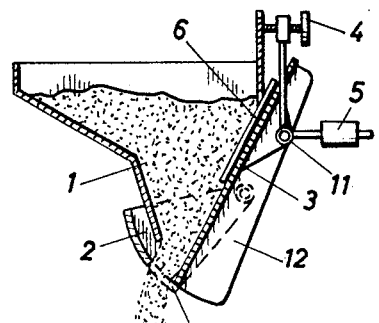
Figure 2:
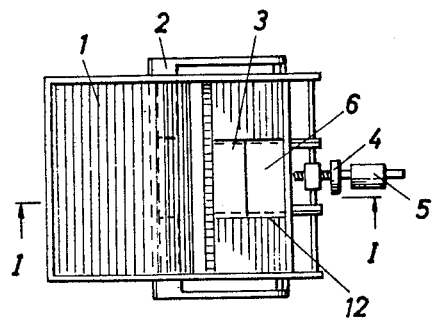
Figure 3:
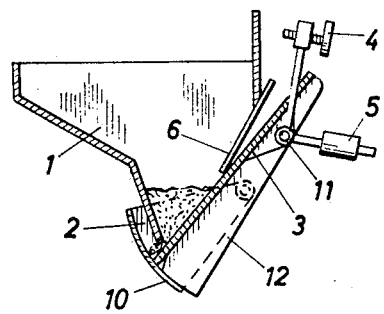
Figure 5:
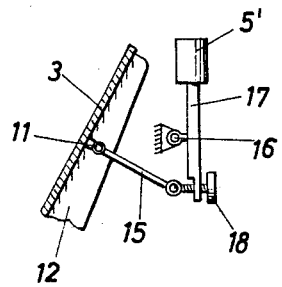
Figure 6:
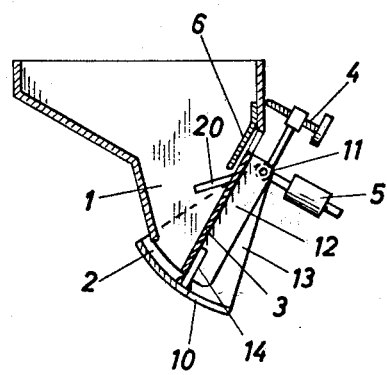
Figures 7, 8:
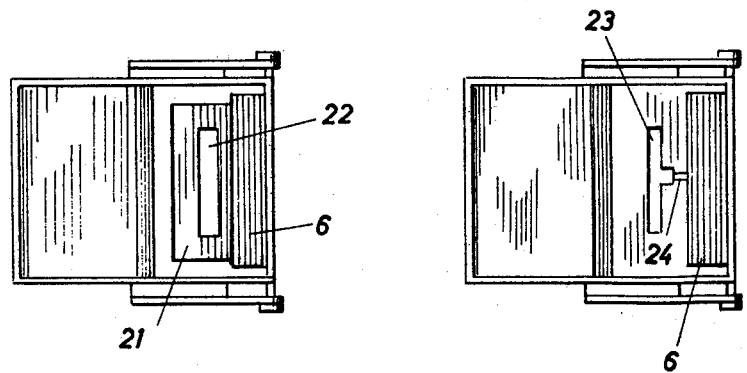

Examples of embodiment of charging hoppers for automatic balances in accordance with the invention are shown in the accompanying drawings, wherein:

FIGURE 1 shows a vertical section through a hopper in the open position,
FIGURE 2 shows a plan view of FIGURE 1,
FIGURE 3 shows this hopper in the closed position,
FIGURE 4 shows this hopper in the fine weighing position,
FIGURE 5 shows an enlarged partial elevation of a counter-weight mounting,
FIGURE 6 shows a vertical section through a hopper with a load surface,
FIGURE 7 shows plan view of a hopper with another load surface,
FIGUURE 8 shows a plan view of a hopper with yet another load surface,
FIGURE 9 shows a vertical section through a hopper with a closer piston in the closed position, whereby the closing surface of the piston is provided with a brush,
FIGURE 10 shows the same hopper but with the fine weighing opening opened,
FIGURES 11 and 12 show vertical sections through a hopper with the same closer piston for the fine weighing opening, but with electro-magnetic control.
FIGURE 13 shows a hopper discharge with a slide valve, illustrated partially.

In the drawings, the example of embodiment as illustrated in FIGURES 1 to 5 discloses a hopper 1 with a closure flap 2. This closure flap possesses a fine weighing opening 10. When the closure flap is pivoted into the discharge of the hopper (FIGURE 4), it closes off the discharge except for the fine weighing opening 10. A part of a hopper wall is constructed as a hinged wall 3 pivotable about a pivot point 11. The width of this hinged wall corresponds at least to the width of the fine weighing opening 10. In the initial position or open position this hinged wall is exactly in alignment with the adjoining hopper wall. The hinged wall 3 is further loaded by a counter-weight 5 in the direction towards the closed position of the fine weighing opening. For the setting of the hinged wall in the open position a regulating screw 4 is provided. The hinged wall 3 is pressed into this open position by the loose bulk material resting thereon. In order to make this load pressure variable, a cover plate 6 pushable into the hopper is provided above the hinged wall, which plate according to its position takes more or less load pressure away from the hinged wall. Similarly the counter-weight 5 is secured in movable fashion on its carrier lever, so that this weight load is also adjustable. The counter-weight lever is preferably so arranged that the counter-weight passes its tilting point within the pivoting range, so that thus already a rapid and sudden opening and closing of the hinged wall are achieved. In FIGURE 5 such a counter-weight mounting is illustrated. On the hinged wall 3 there is secured a lever arm 15 disposed approximately perpendicularly thereof, over the end of which a pivot spindle 16 of a counter-weight 5' is so mounted that the end of the weight part 17 is adjustable in distance from the lever arm end by means of a set screw 18, so that the tipping position of the weight and also the weight pressure are variable.

The hinged wall itself possesses a U-shaped cross-section, the legs of the U forming lateral walls 12 of sector shape.

In place of the counter-weight obviously also another load force, for example a traction or compression spring, can be provided. The actuation of this hinged wall can furthermore also take place electrically, for example also dependent upon the actual level of the bulk material in the hopper.

As compared with the illustrated example of embodiment with one hinged wall as part of a hopper wall obviously the possibility also exists of a multi-lateral modification, for example one entire hopper wall can be constructed as a pivotable hinged wall. The two end or lateral walls of the hopper could also possess these hinged walls. Finally the possibility also exists of providing a plurality of hinged walls, even hinged walls mounted one within the other, which respond to different load pressures or filling heights, in order thus to provide staged discharge openings.

In FIGURES 6 to 8 there is illustrated a hopper 1 which is controlled in the same manner by means of hinged wall 3 and counter-weight 5. The same parts are indicated with the same references as previously. In this case, however, the closure flap 2 is also mounted on the pivot spindle 11 of the hinged wall 3 and is pivotable about this spindle. For this purpose the lateral walls 13 of the closure flap are conducted upwards externally on the lateral walls 12 of the hinged wall as far as the pivot spindle 11, on the extended ends of which they are rotatably mounted. In order to seal off the flaps, which are now concentric, against one another on their radial peripheral walls a closure strip 14 preferably consisting of a flexible material such as brushes, leather or the like can be provided on the hinged wall 3.

Now on the inner side of the hinged wall 3 there is provided a load surface 20 for the loose bulk material. According to FIGURE 6 this surface is directed obliquely downwards. It can extend over the entire inner surface of the hinged wall or only a part thereof. In FIGURE 7 there is shown a load surface 21 the setting angle of which is steeper and which extends obliquely upwards in the closed position. In order not to hinder the flow of material from this load surface, an appropriate surface piercing 22 can be provided. The load surface 23 according to FIGURE 8 is made in spoon shape. It is adjustable along a telescopic handle 24. The load surfaces themselves can also be adjustable in size, as shown in FIGURE 8, so that an exact adaptation to the conditions in each case can also be effected subsequently. It can also be expedient to make the securing of the load surface such that its setting angle is also adjustable.

The examples of embodiment according to FIGURES 9 to 13 now show different closure means for the fine weighing opening.

The hoppers 101 are closed at the discharge 102 by a closure flap 103 pivotable completely out of the discharge. In this closure flap the fine weighing opening 104 is provided. A stripper brush 105 on one side of the hopper serves for stripping off and sealing off the loose bulk material. According to the examples of embodiment as shown in FIGURES 9 to 12 a closer piston 106 movable vertically upwards and downwards is provided, which has an approximately conical form and the closure surface of which is provided with a brush 107. The piston is secured on a piston rod 108, which is guided in a tube 109 in the hopper, according to FIGURES 9 and 10. The supporting of the piston rod against the tube jacket takes place by means of guide brushes 110. At the upper end 111 of the piston rod there acts a lever 112, which is pivotable about a stationary spindle 113. At the opposite end of the lever there is secured a load plate 114 which receives the load pressure of the loose bulk material and according to the load determines the position of the lever 112 and thus that of the closer piston. The weight distribution is here so set that the closer piston normally always stands in the closed position and is only lifted upwards for the purpose of opening in the case of appropriate load pressure upon the load plate 114. While in FIGURE 9 the closed position is shown, in FIGURE 10 the piston 106 is lifted, so that the loose bulk material issues through the fine weighing opening in a regular thickness of flow. The shape of the piston and also the load means are naturally so designed that the least possible resistance occurs in the through flow of the loose bulk material.

In the case of a further form of embodiment, the piston 106, which has an extended rod 120, is actuated by a lifting magnet 121. This lifting magnet is controlled by an electric bin level sensor 122 with a feeler 123, through a lead 124. In FIGURE 11 too little loose bulk material is in the hopper, so that the feeler of the bin level sensor is not in contact with the column of loose bulk material and also has no current connection and therefore the closer piston stands in its closed position. On the other hand in FIGURE 12 the filling of the loose bulk material has reached the feeler 123 of the bin level sensor, thus the lifting magnet is energised and the closer piston is lifted.

In FIGURE 13 there is shown as closure member a horizontally movable slide 130, which is in the closed position in the drawing. The slide is guided through a bearing 131 and actuated for example by means of a pressure cylinder 132. The control of this slide actuation arrangement can also take place electrically or even mechanically through a bin level sensor (not shown) or through other mechanical transmission means. The slide can naturally also be provided on the inner side of the main closure flap, or it can also be conducted from another side.

I claim:

1. A charging hopper for balances for the automatic weighing of fine-grained loose bulk material, especially automatic sacking and recording balances, comprising a closure flap for the hopper discharge regulating the coarse weighing, a fine-weighing opening in said closure flap, a vertically displaceable closure member for opening and closing said fine weighing opening, a load receiving surface in the hopper, and a lever mechanism connecting said load receiving surface and said closure member and bringing said closure member into closing position when the loose bulk material present in the hopper is no longer sufficient for termination of the weighing operation of a predetermined quantity.

2. A charging hopper for balances for the automatic weighing of fine-grained loose bulk material, especially automatic sacking and recording balances, comprising a closure flap for the hopper discharge regulating the coarse weighing, a fine-weighing opening in said closure flap, a vertically displaceable closure member for opening and closing said fine weighing opening, a bin level sensor, a lifting magnet operatively connected with said sensor and actuating said closure member, said closure member being brought into closing position when the loose bulk material present in the hopper is no longer sufficient for termination of the weighing operation of a predetermined quantity.

3. A charging hopper for balances for the automatic weighing of fine-grained loose bulk material, especially automatic sacking and recording balances, comprising a closure flap for the hopper discharge regulating the coarse weighing, a fine-weighing opening in said closure flap, a horizontally movable sliding valve located below said fine-weighing opening and displaceable into opening and closing position, and means moving said valve into closing position when the loose bulk material present in the hopper is no longer sufficient for termination of the weighing operation of a predetermined quantity.

4. A charging hopper for balances for the automatic weighing of fine-grained loose bulk material, especially automatic sacking and recording balances, comprising a closure flap for the hopper discharge regulating the coarse weighing, a fine-weighing opening in said closure flap, hinged wall means forming at least part of a wall of said hopper and arranged for pivotal movement into the discharge of the hopper so as to close said fine-weighing opening, and loading means holding said hinged wall means in said closing position and allowing said wall means to open said fine-weighing opening only when the hopper contains a predetermined amount of said bulk material.

5. A hopper as claimed in claim 4 wherein said hinged wall means when in the position opening said fine-weighing opening are in alignment with the respective hopper wall.

6. A hopper as claimed in claim 4 wherein said hinged wall means has a U-shaped cross-section with sector-shaped lateral walls.

7. A hopper as claimed in claim 4 comprising a cover plate displaceable inside the hopper over said hinged wall means to vary the load pressure of the bulk material on said wall means.

8. A hopper as claimed in claim 4 comprising a plurality of said hinged wall means and means for separately setting each of said wall means.

9. A hopper as claimed in claim 4 comprising a load surface provided at said hinged wall means and projecting into the hopper, said load surface when impinged by the material filled into the hopper counteracting said loading means.

References Cited in the file of this patent
UNITED STATES PATENTS

| | | |
|---|---|---|
| 300,816 | Thompson | June 24, 1884 |
| 352,446 | Butterfield | Nov. 9, 1886 |
| 403,988 | Cooley | May 28, 1889 |
| 442,714 | Richards | Dec. 16, 1890 |
| 451,352 | Swoboda | May 5, 1891 |